US011182087B2

(12) United States Patent
Rajgopal et al.

(10) Patent No.: US 11,182,087 B2
(45) Date of Patent: Nov. 23, 2021

(54) MODIFYING WRITE PERFORMANCE TO PROLONG LIFE OF A PHYSICAL MEMORY DEVICE

(71) Applicant: Micron Technology, Inc., Boise, ID (US)

(72) Inventors: Suresh Rajgopal, San Diego, CA (US); Zhi Kai Feng, Shanghai (CN); Yue Wei, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 4 days.

(21) Appl. No.: 16/662,943

(22) Filed: Oct. 24, 2019

(65) Prior Publication Data

US 2021/0096756 A1    Apr. 1, 2021

(51) Int. Cl.
*G06F 3/06* (2006.01)
*G06F 12/02* (2006.01)

(52) U.S. Cl.
CPC .......... *G06F 3/0634* (2013.01); *G06F 3/064* (2013.01); *G06F 3/0616* (2013.01); *G06F 3/0652* (2013.01); *G06F 3/0659* (2013.01); *G06F 3/0679* (2013.01); *G06F 12/0246* (2013.01)

(58) Field of Classification Search
CPC ...... G06F 3/0616; G06F 3/0634; G06F 3/064; G06F 3/0659; G06F 3/0679; G06F 12/0246
See application file for complete search history.

(56) References Cited

U.S. PATENT DOCUMENTS

| 2007/0263444 | A1* | 11/2007 | Gorobets | G11C 16/349 365/185.09 |
| 2012/0297127 | A1* | 11/2012 | Belluomini | G06F 12/0866 711/103 |
| 2013/0007380 | A1* | 1/2013 | Seekins | G06F 3/0616 711/154 |
| 2014/0365714 | A1* | 12/2014 | Sweere | G06F 1/3268 711/103 |
| 2015/0301754 | A1* | 10/2015 | Kochar | G06F 3/0616 711/103 |

OTHER PUBLICATIONS

Sungjin Lee et al., "Lifetime Management of Flash-Based SSDs Using Recovery-Aware Dynamic Throttling", Feb. 2012, USENIX, Proceedings of the 10th USENIX conference on File and Storage Technologies, pp. 1-14 (Year: 2012).*

* cited by examiner

*Primary Examiner* — Reginald G Bragdon
*Assistant Examiner* — Curtis James Kortman
(74) *Attorney, Agent, or Firm* — Nicholson De Vos Webster & Elliott LLP (57) ABSTRACT

A memory device protection manager determines an estimated remaining life of a physical memory device. By comparing the estimated remaining life of the physical memory device to a threshold value, the memory device protection manager determines whether a drive protection condition has been triggered. When the drive protection condition is triggered, the memory device protection manager modifies a write performance for subsequent data units to a modified write performance rate. The modified write performance rate is an upper limit on the write performance for the subsequent data units.

20 Claims, 3 Drawing Sheets

MODIFYING WRITE PERFORMANCE TO PROLONG LIFE OF A PHYSICAL MEMORY DEVICE

CROSS-REFERENCE TO RELATED APPLICATION

The present application claims the benefit of International Application No. PCT/CN2019/108717 filed on Sep. 27, 2019, which is hereby incorporated by reference.

TECHNICAL FIELD

The present disclosure relates to memory subsystems, and more specifically, relates to modifying write rates to preserve remaining life of a physical memory device.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to a memory device protection manager in a memory subsystem. A memory sub-system can be a storage device, a memory module, or a hybrid of a storage device and memory module. Examples of storage devices and memory modules are described below in conjunction with FIG. 1. In general, a host system can utilize a memory subsystem that includes one or more memory devices that store data. The host system can provide data to be stored at the memory subsystem and can request data to be retrieved from the memory subsystem.

Memory subsystems receive data from host systems to write to physical memory devices, including to non-volatile memory (e.g., a negative-and (NAND) flash memory). While a physical memory device is in a read-write operating mode, normal input/output (I/O) processes are processed. In some situations, a physical memory device is modified from a normal read-write operating mode to a read-only mode, e.g., when data can no longer be written to the physical memory device and/or when data written to the physical memory device cannot be reliably read back. Some physical memory devices (e.g., hard disk drives (HDDs)) do not have a concept of endurance (e.g., based on the mechanical reliability of the heads of the physical memory device). In some situations, other physical memory devices, such as solid state drives (SSDs), can have lower endurance targets for random write workloads and higher endurance targets for sequential workloads. For example, on an SSD, write endurance targets can be less than 0.1 drive writes per day (DWPD) for random write workloads and approximately 0.5 DPWD for sequential workloads. Given an SSD with a capacity of 2 TBs, the expected write endurance of the SSD would be less than 2 GBs per day for random write workloads and 10 GBs per day for sequential workloads. Additional factors that can affect the write endurance targets of physical memory devices include the amount of overprovisioning, the type of NAND, the number of cycles the physical memory device is rated for, and the size of the random transfer.

Previous approaches to address this issue include constraining the workload on the drive by minimizing random write workloads. However, because the form of workloads to be written cannot always be predicted, e.g., workloads include both small, random workloads and long, sequential workloads, it can be difficult to manage the endurance of physical memory devices.

A memory device can be a non-volatile memory device. A non-volatile memory device is a package of one or more dice. Each die can consist of one or more planes. For some types of non-volatile memory devices (e.g., NAND devices), each plane consists of a set of physical blocks. Each block consists of a set of pages. Each page consists of a set of memory cells, which store bits of data. A bad block hereinafter refers to block that is no longer reliable for storing or retrieving data, for example, due to a defect (e.g., manufacturing defect) or due to wear. A grown bad block hereinafter refers to a block being unreliable due to wear. A grown bad block can be identified based on a threshold (e.g., bit error rates (BER) threshold).

Another approach is tracking the grown bad blocks (GBB) parameter, which are marked portions of the physical memory device that can no longer be written to. However, typically GBB grow exponentially towards the end of life of physical memory devices, such that by the time GBBs are identified, the physical memory device is very close to end of life. Once the GBB begins increasing rapidly, the physical memory device will enter a write protect mode. Because the physical memory device is near end of life, there are not many cycles remaining in which to effect or prolong the endurance of the physical memory device, and the physical memory device will need to be removed or swapped.

Aspects of the present disclosure provide efficiencies in the endurance of physical memory devices regardless of the types of workloads being written. In one embodiment, the system uses determinable changes in the estimated remaining life of the physical memory device to modify the write performance rate of write cursors writing to the physical memory device. For example, as the estimated remaining life of a physical memory device decreases, a memory subsystem can throttle the write performance rate to prolong the device's remaining life. Additional aspects of the disclosure describe using the estimated remaining life of the physical memory device in conjunction with a minimum write performance rate (e.g., a write performance floor rate) to control how the physical memory device goes from a read-write operating mode to a read-only mode.

Figure 1:
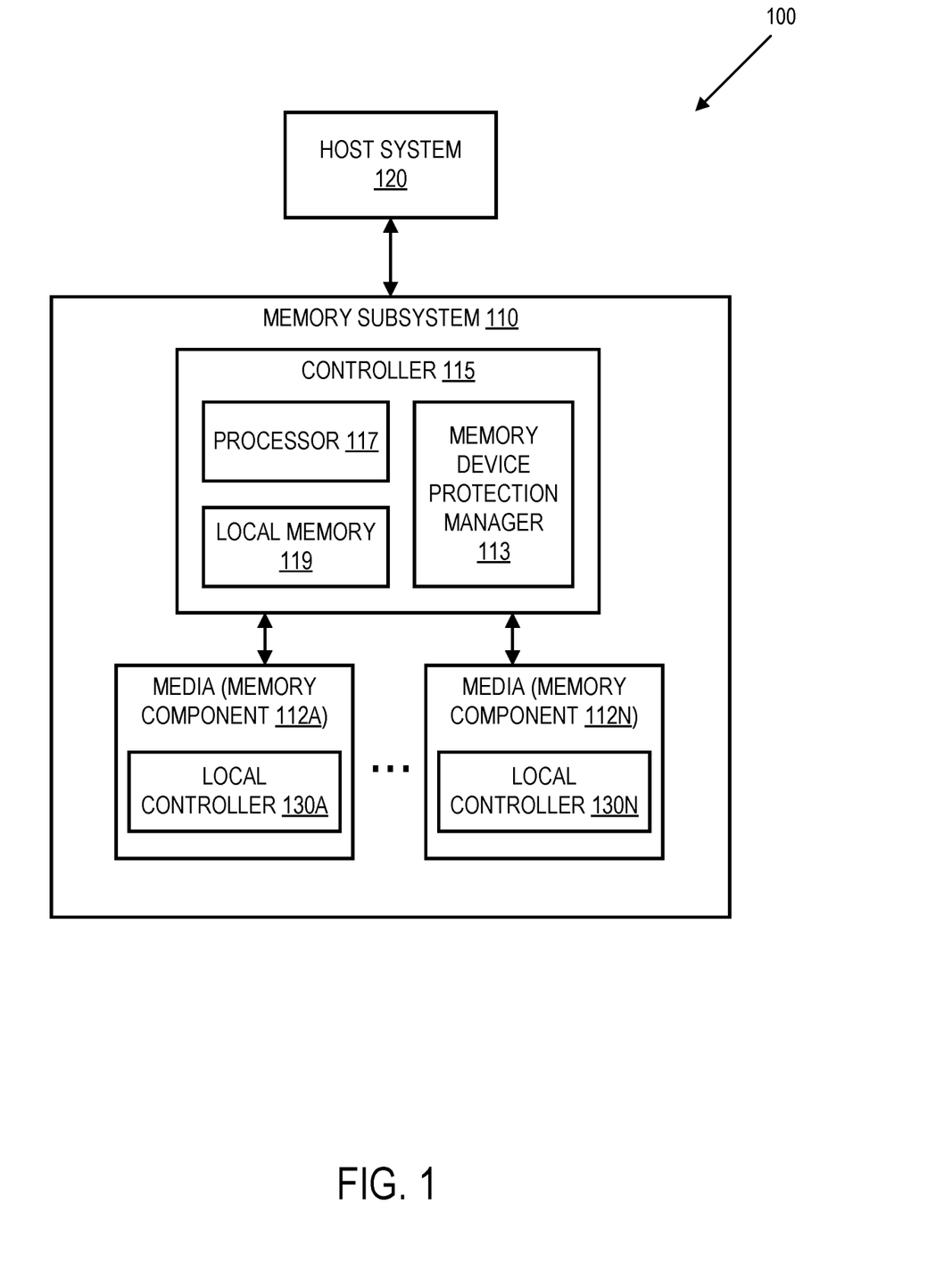
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N (also hereinafter referred to as "memory devices"). The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs), multi-level cells (MLCs), triple level cells (TLCs), or quad-level cells (QLCs). In some embodiments, a particular memory component can include both an SLC portion and a MLC portion of memory cells. Each of the memory cells can store one or more bits of data used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped to form pages that can refer to a unit of the memory component used to store data. With some types of memory (e.g., NAND), pages can be grouped to form blocks.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

Any one of the memory components 112A to 112N can include a local controller (e.g., local controller 130A and local controller 130N) to manage the memory cells of the memory component 112, to communicate with the memory sub-system controller 115, and to execute memory requests (e.g., read or write) received from the memory sub-system controller 115.

The memory subsystem 110 includes a memory device protection manager 113 that evaluates information regarding the rates write cursors are writing data (e.g., data units) into a memory component (e.g., memory component 112A-112N), e.g., of a physical memory device. In one embodiment, each data unit is 4 KB in size. In other embodiments, the size of the data unit can vary based on configuration data. The data units can be referred to as translation units (TUs) or logical block addresses (LBAs).

In some embodiments, the memory components 112A to 112N can be managed memory devices (e.g., managed NAND), which is a raw memory device combined with a local controller 130 for memory management within the same memory device package. A local controller 130 can include a device protection manager 113.

The memory device protection manager 113 also determines the estimated remaining life of the physical memory device. The memory device protection manager 113 compares the estimated remaining life of the physical memory device with a physical memory device protection condition (also referred to as "a drive protection condition"). For example, the physical memory device protection condition is triggered when the estimated remaining life of the physical memory device drops below a threshold value defined by the physical memory device protection condition. Based on determining that the physical memory device protection condition has been triggered, the memory device protection manager 113 can modify, or instruct the memory subsystem 110 to modify, the write performance rate, so that subsequent data units are written at the modified write performance rate. In addition, the memory device protection manager 113 can place the physical memory device in a read-only mode, preventing additional write operations to the physical memory device, when the physical memory device is below a minimum write performance rate. In some embodiments, the controller 115 includes at least a portion of the memory device protection manager 113. For example, the controller 115 can include a processor 117 (processing device) configured to execute instructions stored in local memory 119 for performing the operations described herein. In some embodiments, the memory device protection manager 113 is part of the host system 110, an application, or an operating system.

Figure 2:
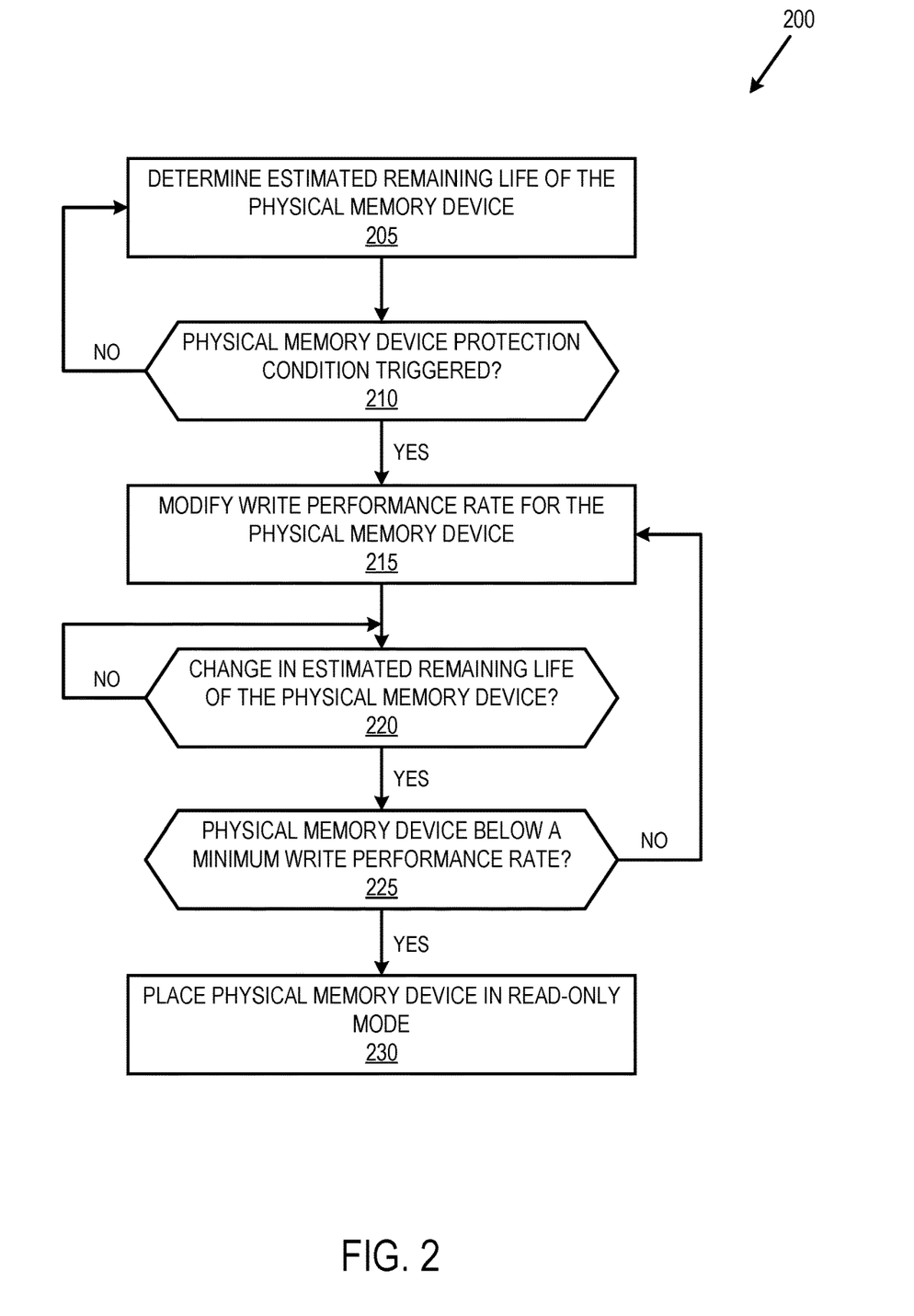
FIG. 2 is a flow diagram of an example method to manage write performance for a physical memory device, in accordance with some embodiments of the present disclosure.

FIG. 2 is a flow diagram 200 of an example method to manage write performance for a physical memory device, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory device protection manager 113 of FIG. 1 or one or more subcomponents of the memory device protection manager 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 205, the processing device determines an estimated remaining life of the physical memory device. In one embodiment the estimated remaining life of the physical memory device is a percentage value of the full life of the physical memory device. In one embodiment, the processing device determines the estimated remaining life by determining or retrieving an average erase count for a set of memory blocks in the physical memory device. In some embodiments, the set of memory blocks can be all or less than all of the memory blocks in the physical memory device. The processing device can determine or retrieve the average erase count information at periodic intervals (e.g., daily, weekly, etc.). The processing device then calculates the estimated remaining life of the physical memory device using the determined average erase count. An average erase counter (not illustrated) tracks the erase count per block and averages the erase count across all the blocks in a physical memory device. In one embodiment, the processing device stores the determined estimated remaining life of the physical memory device.

In one embodiment, the estimated remaining life of the physical memory device can be calculated using the following equation:

$$V_C = S_M - \left(S_M \times \frac{E_{AVG}}{B_L}\right)$$

In the above equation, $S_M$ is a SMART_MAX_ATTRIBUTE_VALUE (0×64), where SMART stands for "Self-Monitoring, Analysis and Reporting Technology" and is a capability of physical memory devices to monitor and report various attributes of physical memory devices. In one embodiment, SMART_MAX_ATTRIBUTE_VALUE (0×64) is a maximum value for SMART attribute values. In one embodiment, the value of SMART_MAX_ATTRIBUTE_VALUE (0×64) is 1, 100%, or (0×64). In the above equation, $E_{AVG}$ is the average erase count of all blocks and $B_L$ is the program/erase (P/E) count that the blocks are rated to meet the target endurance.

At block 210, the processing device determines whether a physical memory device protection condition has been triggered. In one embodiment, the physical memory device protection condition is triggered by comparing the estimated remaining life of the physical memory device to a threshold amount. In one embodiment, the physical memory device protection condition can be triggered when the estimated remaining life of the physical memory device falls below the threshold amount. The threshold amount can be a default value, a user-configurable value (e.g., dependent on user specifications or usage requirements), or a dynamic value based on observed and expected workloads. For example, the threshold amount can be when the estimated remaining life of the physical memory device falls below 10% or 5%. When the processing device determines that the physical memory device protection condition has been triggered, the flow proceeds to block 215. When the processing device determines that the physical memory device protection condition has not been triggered, the flow returns to block 205 to continue determining the estimated remaining life of the physical memory device.

In some embodiment, physical memory device protection condition can be triggered by other factors, including exceeding a temperature threshold, loss of hold-up capacitance, and power loss recovery failure.

At block 215, in response to determining that the physical memory device protection condition has been triggered, the processing device modifies the write performance rate for subsequent data units. In one embodiment, the current write performance rate is determined by the processing device (e.g., via feedback from memory subsystem 110). In one embodiment, write performance rate is expressed as input/output operations per second (IOPS). An example SSD memory device can perform between 3K-9K IOPS. In one embodiment, the current write performance rate represents the current upper limit on the write performance at which the memory subsystem 110 is currently writing data units to the physical memory device. When the physical memory device protection condition is triggered, modifying the write performance rate includes the processing device instructing the memory subsystem 110 to write the data units to the physical memory device at the modified write performance rate. The modified write performance rate can represent a new upper limit on the write performance rate at which the memory subsystem 110 can write subsequent data units to the physical memory device.

In one embodiment, modifying the write performance rate for the physical memory device includes determining a write performance floor value, which indicates a lowest write performance rate for the physical memory device. When the modification of the write performance rate reaches the write performance floor value, the physical memory device enters, or the processing device places the physical memory device into, a read-only mode. The write performance floor value can be a default value or a user-defined value.

In one embodiment, the processing device instructs the memory subsystem to add a delay to a write command process to reduce write performance for the physical memory device to the modified write performance rate. In one embodiment, the processing device uses a flow control operation that is typically used to delay the reception of data units when a write buffer is approaching its limit. However, the flow control operation can be initiated even when the write buffer is not approaching its limit to throttle the write performance.

Using a current write performance rate and the write performance floor value for the physical memory device, the processing device can determine a rate at which to reduce the write performance from the current write performance rate to the write performance floor value based on an amount of time (e.g., a percentage remaining life of the physical memory device). For example, for a physical memory device with a trigger condition of 80% estimated remaining life, the processing device reduces write performance by 3% for every 1% drop in estimated remaining life of the physical memory device. In one embodiment, the processing device makes subsequent changes to write performance rates based on the write performance rate when the physical memory device protection condition was triggered. Based on this example, given an SSD with an initial write performance rate of 9,000 IOPS, when the estimated remaining life drops from 81% to 80%, the processing device modifies the write performance rate to 8,730 IOPS in response to the physical memory device protection condition being triggered.

At block 220, the processing device determines whether there has been a change in the estimated remaining life of the physical memory device. The processing device determines an updated/current estimated remaining life of the physical memory device as described in block 205. In embodiments where the processing device stores the estimated remaining life of the physical memory device, the processing device retrieves the most recently stored value for the estimated remaining life and compares the value with the updated/current estimated remaining life of the physical memory device. When the processing device determines that there has not been a change in the estimated remaining life of the physical memory device (e.g., the percentage of estimated remaining life has not changed by at least a threshold amount), the processing device continues to monitor the physical memory device to determine whether there is a change in the estimated remaining life of the physical memory device. When the processing device determines that there has been a change in the estimated remaining life of the physical memory device (e.g., the percentage of estimated remaining life has changed by at least the threshold amount), the flow proceeds to block 225. In one embodiment, the processing stores the updated/current estimated remaining life of the physical memory device for future comparisons.

At block 225, the processing device determines whether the physical memory device is below the minimum write performance rate (e.g., a write performance floor value). When the physical memory device is not below the minimum write performance rate, the flow proceeds back to block 215, where the processing device again modifies the write performance rate for subsequent data units based on the most recent change in the remaining life of the physical memory device. Continuing the example from above, the processing device reduces the write performance rate by 3% for every 1% change in the estimated remaining life of the physical memory device. In one embodiment, the processing device continues to reduce the write performance rate for the physical memory device in response to changes (e.g., reductions) in the estimated remaining life of the physical memory device, until the minimum write performance rate is reached. When the physical memory device drops below the minimum write performance rate, the flow proceeds to block 230.

At block 230, the processing device places the physical memory device in a read-only mode. The write performance rate for the physical memory device dropping below the minimum write performance rate can be an indication that the physical memory device is approaching its end of life. In response, the processing device places the physical memory device in the read-only mode to protect the data already written to the physical memory device. Additional data units cannot be written on the physical memory device unless the physical memory device is placed back into a read-write mode.

Figure 3:
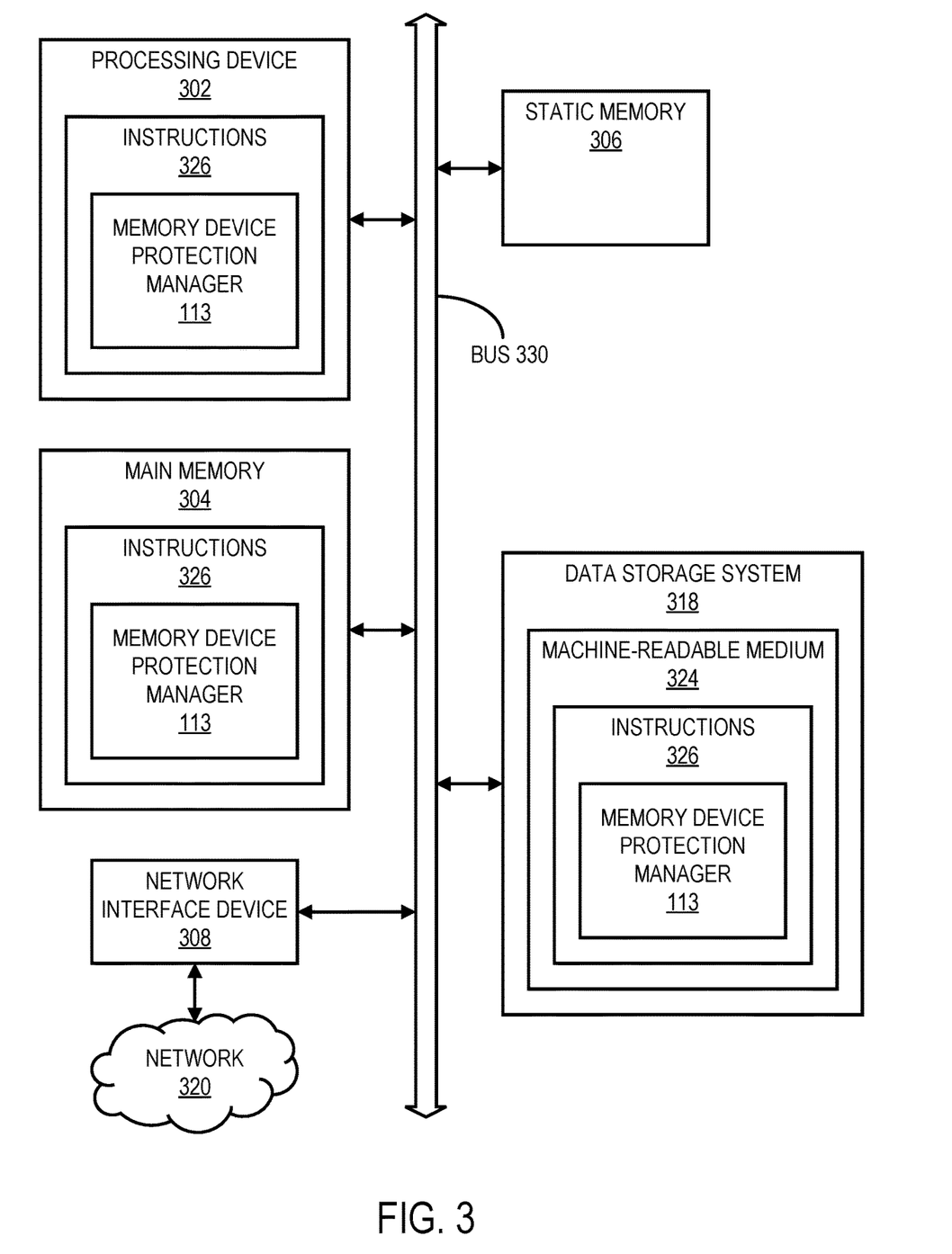
FIG. 3 is a block diagram of an example computer system in which embodiments of the present disclosure may operate.

FIG. 3 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the memory device protection manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage system 318, which communicate with each other via a bus 330.

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable storage medium 324, data storage system 318, and/or main memory 304 can correspond to the memory subsystem 110 of FIG. 1.

In one embodiment, the instructions 326 include instructions to implement functionality corresponding to a memory device protection manager (e.g., the memory device protection manager 113 of FIG. 1). While the machine-readable storage medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining an estimated remaining life of a physical memory device;
   determining that a drive protection condition has been triggered by comparing the estimated remaining life of the physical memory device to a threshold value; and
   in response to determining that the drive protection condition has been triggered, modifying an upper limit on write performance for subsequent data units from a current upper limit to a reduced upper limit, the reduced upper limit being determined using the current upper limit, a minimum write performance rate, and an amount by which the estimated remaining life has fallen below the threshold value.

2. The method of claim 1, wherein determining the estimated remaining life of the physical memory device comprises:
   determining an average erase count for a set of memory blocks in the physical memory device; and
   calculating the estimated remaining life of the physical memory device using the determined average erase count.

3. The method of claim 2, wherein the average erase count for the set of memory blocks in the physical memory device is determined at periodic intervals.

4. The method of claim 1, wherein modifying the upper limit on write performance for the subsequent data units comprises:
   adding a delay to a write command process to reduce a write performance for the physical memory device.

5. The method of claim 4, wherein adding the delay to the write command process includes using a flow control operation to delay the reception of the subsequent data units.

6. The method of claim 1, wherein the reduced upper limit is a first reduced upper limit, and wherein the method further comprises:
   determining a change in the estimated remaining life of the physical memory device;
   in response to determining the change in the estimated remaining life of the physical memory device, modifying the upper limit on write performance for the subsequent data units from the first reduced upper limit to a second reduced upper limit.

7. The method of claim 6, further comprising:
   identifying the minimum write performance rate for the physical memory device; and
   in response to the second reduced upper limit being below the minimum write performance rate, placing the physical memory device in a read-only mode.

8. A non-transitory computer-readable medium storing instructions, which when executed by a processing device, cause the processing device to:
   determine an estimated remaining life of a physical memory device;
   determine that a drive protection condition has been triggered by comparing the estimated remaining life of the physical memory device to a threshold value; and
   in response to determining that the drive protection condition has been triggered, modify an upper limit on write performance for subsequent data units from a current upper limit to a reduced upper limit, the reduced upper limit being determined using the current upper limit, a minimum write performance rate, and an amount by which the estimated remaining life has fallen below the threshold value.

9. The non-transitory computer-readable medium of claim 8, wherein determining the estimated remaining life of the physical memory device comprises:
   determining an average erase count for a set of memory blocks in the physical memory device; and
   calculating the estimated remaining life of the physical memory device using the determined average erase count.

10. The non-transitory computer-readable medium of claim 9, wherein the average erase count for the set of memory blocks in the physical memory device is determined at periodic intervals.

11. The non-transitory computer-readable medium of claim 8, wherein modifying the upper limit on write performance for the subsequent data units comprises:
    adding a delay to a write command process to reduce a write performance for the physical memory device.

12. The non-transitory computer-readable medium of claim 11, wherein adding the delay to the write command process includes using a flow control operation to delay reception of the subsequent data units.

13. The non-transitory computer-readable medium of claim 8, wherein the reduced upper limit is a first reduced upper limit, and the instructions further cause the processing device to:
    determine a change in the estimated remaining life of the physical memory device; and
    in response to determining the change in the estimated remaining life of the physical memory device, modify the upper limit on write performance for the subsequent data units from the first reduced upper limit to a second reduced upper limit.

14. The non-transitory computer-readable medium of claim 13, wherein the instructions further cause the processing device to:
    identify the minimum write performance rate for the physical memory device; and
    in response to the second reduced upper limit being below the minimum write performance rate, place the physical memory device in a read-only mode.

15. A system comprising:
    a memory component; and a processing device, coupled to the memory component, configured to:
  determine an estimated remaining life of a physical memory device by being further configured to:
    determine an average erase count for a set of memory blocks in the physical memory device, and
    calculate the estimated remaining life of the physical memory device using the determined average erase count;
  determine that a drive protection condition has been triggered by comparing the estimated remaining life of the physical memory device to a threshold value; and
  in response to determining that the drive protection condition has been triggered, modify an upper limit on write performance for subsequent data units from a current upper limit to a reduced upper limit, the reduced upper limit being determined using the current upper limit, a minimum write performance rate, and an amount by which the estimated remaining life has fallen below the threshold value.

16. The system of claim 15, wherein the average erase count for the set of memory blocks in the physical memory device is determined at periodic intervals.

17. The system of claim 15, wherein modifying the upper limit on write performance for the subsequent data units comprises:
  adding a delay to a write command process to reduce a write performance for the physical memory device.

18. The system of claim 17, wherein adding the delay to the write command process includes using a flow control operation to delay the reception of the subsequent data units.

19. The system of claim 15, wherein the reduced upper limit is a first reduced upper limit, and wherein the processing device is further configured to:
  determine a change in the estimated remaining life of the physical memory device; and
  in response to determining the change in the estimated remaining life of the physical memory device, modify the upper limit on write performance for the subsequent data units from the first reduced upper limit to a second reduced upper limit.

20. The system of claim 19, wherein the processing device is further configured to:
  identify the minimum write performance rate for the physical memory device; and
  in response to the second reduced upper limit being below the minimum write performance rate, place the physical memory device in a read-only mode.

* * * * *

UNITED STATES PATENT AND TRADEMARK OFFICE
CERTIFICATE OF CORRECTION

| | |
|---|---|
| PATENT NO. | : 11,182,087 B2 |
| APPLICATION NO. | : 16/662943 |
| DATED | : November 23, 2021 |
| INVENTOR(S) | : Suresh Rajgopal et al. |

It is certified that error appears in the above-identified patent and that said Letters Patent is hereby corrected as shown below:

On the Title Page

In the left Column, below the Prior Publication Data, insert the following two lines:
--(30) Foreign Application Priority Data
Sep. 27, 2019 (CN) .......... PCT/CN2019/108717--

Signed and Sealed this
Fifteenth Day of August, 2023

Katherine Kelly Vidal
*Director of the United States Patent and Trademark Office*